United States Patent [19]
Boquet

[11] 4,077,507
[45] Mar. 7, 1978

[54] METAL SHEET CONVEYOR WITH LINEAR ELECTRIC MOTOR AND GROUND-EFFECT SHOE

[75] Inventor: Jean Pierre Michel Boquet, Gif-sur-Yvette, France

[73] Assignee: Bertin & Cie, Plaisir, France

[21] Appl. No.: 640,026

[22] Filed: Dec. 11, 1975

[30] Foreign Application Priority Data

Dec. 16, 1974   France .................................. 74 41326

[51] Int. Cl.$^2$ ............................................. B65G 35/00
[52] U.S. Cl. ................... 198/619; 271/18.1; 271/195; 214/8.5 D; 310/12
[58] Field of Search .................. 198/35, 41, 619, 443; 302/11, 31, 29; 310/12–14; 271/18.1, 97, 195; 214/1 BE, 8.5 R, 8.5 C, 8.5 D, 8.5 E, 8.5 G; 104/148 LM; 180/117

[56] References Cited

U.S. PATENT DOCUMENTS

| | | | |
|---|---|---|---|
| 3,268,265 | 8/1966 | Willott | 302/29 |
| 3,357,511 | 12/1967 | Mackie | 310/13 |
| 3,534,872 | 10/1970 | Roth et al. | 214/8.5 C |
| 3,610,695 | 10/1971 | Yabuta | 198/41 |
| 3,805,978 | 4/1974 | Hahne | 214/8.5 D |

FOREIGN PATENT DOCUMENTS

| | | | |
|---|---|---|---|
| 450,536 | 3/1913 | France | 302/31 |

OTHER PUBLICATIONS

Sadler et al., "Applications of Linear Induction Motors in Industry," pp. 765–776 June 1971, vol. 118 of The Institution of Electrical Engineers Proceedings.

*Primary Examiner*—Evon C. Blunk
*Assistant Examiner*—Joseph E. Valenza
*Attorney, Agent, or Firm*—A. W. Breiner

[57] ABSTRACT

A conveyor apparatus is designed for the propulsion of metal sheets and more specifically sheets of ferromagnetic material. It operates by means of a linear induction motor associated with fluid cushion developing shoes. The apparatus is arranged to be movable perpendicularly to the sheets, its weight being counter-balanced so as not to react thereon. It is useful for sheet distributing machines.

6 Claims, 5 Drawing Figures

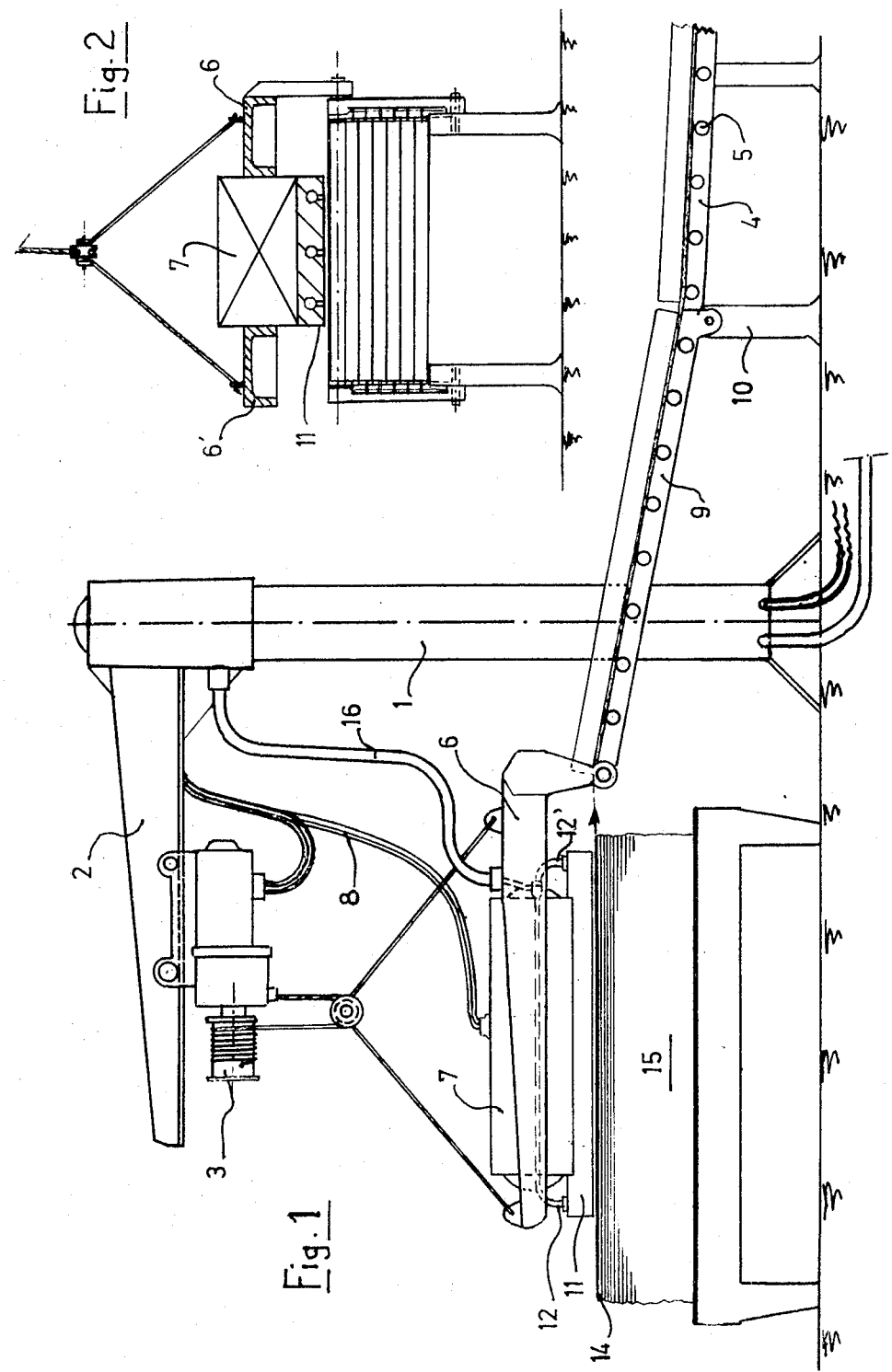

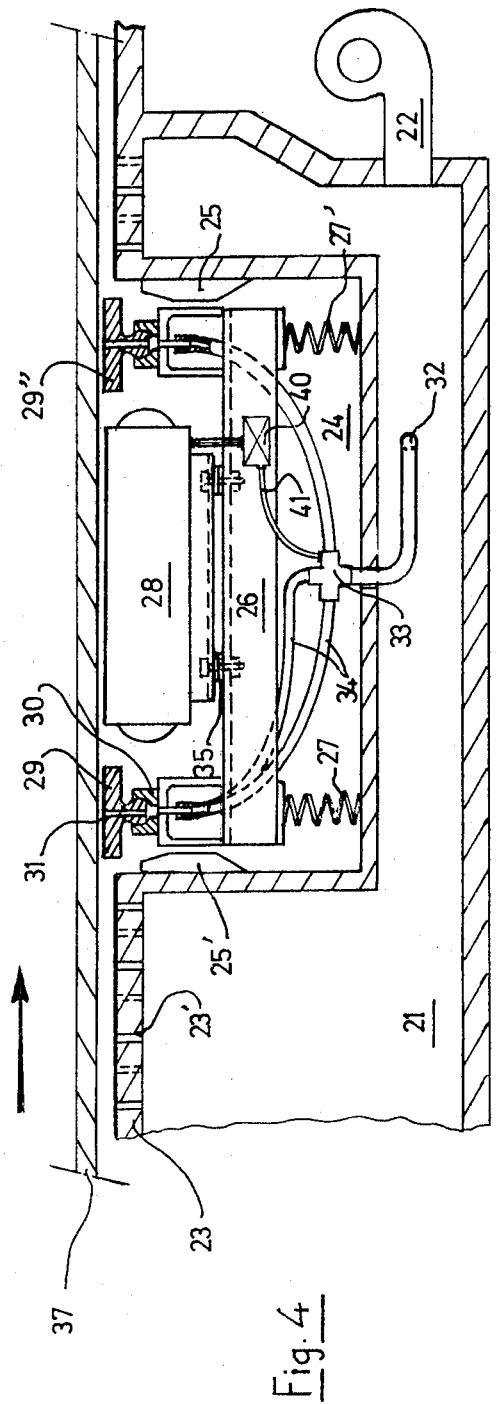
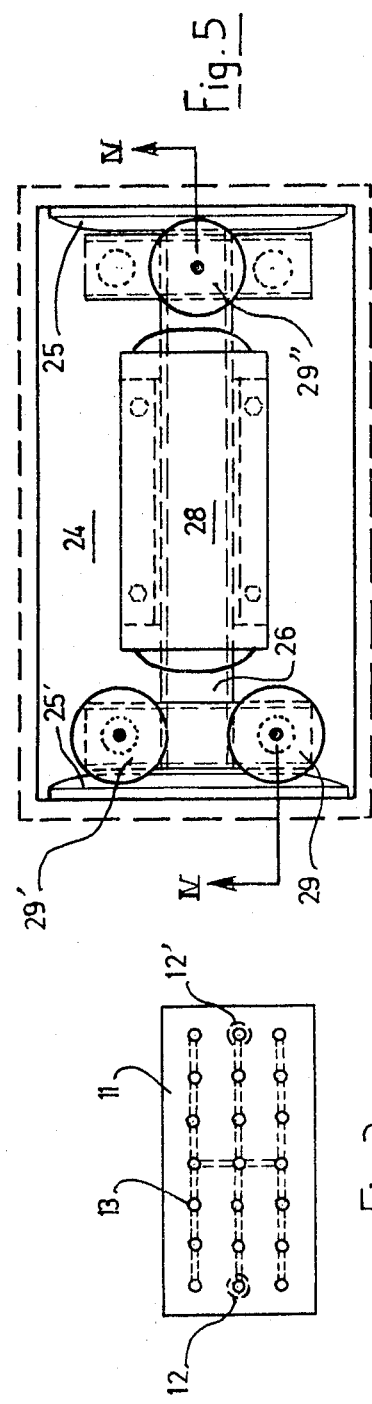

METAL SHEET CONVEYOR WITH LINEAR ELECTRIC MOTOR AND GROUND-EFFECT SHOE

The flat transfer of metal sheets is at present carried out either by pneumatic suction cups or electromagnets suspended from an overhead crane, when the said metal sheets are cut up, or on rollers, or more recently on cushions of fluid under pressure (called ground effect) for example when a strip of sheet metal is circulating continuously.

In all these known systems, particular means ensure the transfer movement: wheels on the overhead crane in the first case, moving rollers or moving reels in the second case.

At present, all these systems require a material support for the surface of the metal sheet on a fixed or rotary object which causes shocks generating noise and faults in the surface of the sheet metal.

The task of the invention is to ensure the transfer of metal sheets without contact other than guides for the edges of the sheets and with very little effort so as to eliminate the faults mentioned above whilst producing at the same time, an apparatus more simple to install and to service, thus more economical.

To this end, the invention is characterized by the use within the field of metallurgy and more particularly for the transfer of metal sheets, of a propulsion unit constitued by a linear electric motor and a shoe forming a cushion of fluid under pressure called a ground effect shoe, that is to say without material contact with the surface of the metal sheet, the said unit being connected to a fixed frame by a common connecting member. An association which is known in the field of vehicles, for example in the publication of the Journal New Scientist No. 255 which appeared in the United States of America on the 5th Oct. 1961, at the end of an article by E. R. Laithwaite, is recommended specifically in the case of the transfer of steel sheets from the fact that a linear motor disposed on a single face of these sheets develops an attractive force around ten times greater than the longitudinal thrust which it is capable of exerting.

A cushion of fluid under quite a high pressure associated with such a linear motor can then counter balance the said attractive force. This has been described in the related case of an electromagnet having a static magnetic field, in French Pat. No. 450,536 applied for on the 25th Oct. 1912 by M. Graemiger.

The unit associating the linear motor and the cushion of fluid, although not in contact with the steel sheet, attracts the latter strongly up to the immediate proximity of the cushion of fluid shoe, only allowing a very small clearance between it and the latter so that the consumption of fluid under pressure which escapes due to this clearance is not excessive.

Nevertheless, such a proximity between the moving sheet and the propulsion unit is an inconvenience for the transfer of metal sheets since they always have undulations or displacements as regards their position greater than this very small clearance. According to a second characteristic of the invention, the propulsion unit is connected to a fixed frame by means of a member which allows said unit to move substantially perpendicular to the surface of the sheet, that is to say in general a vertical movement.

With this connecting member, the propulsion unit in question may be brought into the desired position with respect to the sheet whatever the vertical position or the deformation of the latter may be.

If, for example, pieces of ferromagnetic sheet metal are stacked, the connecting member permits a manual or automatic approach of a combined propulsion unit in accordance with the invention. With a suitable regulation of its electrical supply, the linear motor will bring about raising of the topmost piece of sheet metal and its transfer in the sense of displacement of the magnetic field of the linear motor of the (propulsion) element, whilst the associated fluid cushion will prevent contact with the sheet. Thus, the "de-stacking" of a pile of pieces of sheet metal is carried out very simply whatever the height of the said pile may be.

In the case where a continuous strip of sheet metal supported on rollers or on other fluid cushions, has to be transferred, the propulsion element, the mass of which will be suitably balanced by means of a spring or of a counter weight, will automatically position itself, by virtue of the vertical movement which the connecting member allows it, at a small distance determined by the fluid flow, and that will happen whatever may be the casual undulations or the thickness of the metal sheet.

The following figures describe various embodiments of the apparatus according to the invention, by way of example and in greater detail.

FIG. 1 shows a machine in elevation for de-stacking and transferring a pile of ferromagnetic metal sheets.

FIG. 2 shows a part of the same machine in an end view and partial section with its propulsion unit.

FIG. 3 is a view from below of the same propulsion unit specifying one disposition of the associated fluid cushion.

FIG. 4 is a section in elevation of a transfer chute for thick sheet metal in a strip or in sections together with a propulsion unit according to the invention.

FIG. 5 is a plan view of the propulsion unit according to FIG. 4 and its connecting member.

The de-stacking machine of FIGS. 1 and 2 comprises a column 1 fixed to the ground and carrying a bracket 2 with a winch 3 as well as a transfer chute 4 having rollers such as 5, the rollers of which may be covered with a transfer strip or belt (not shown) in the case where the metal sheets risk being damaged by the rollers. The winch 3 supports a horizontal frame which is formed of two side beams 6 and 6' and of cross beams, and which supports a linear motor 7 supplied with three phase electric current through a cable 8 connected to a suitable source. Such linear motors are available on the market. Furthermore, the side beam 6 supports the movable end of a transfer chute 9 hinged to the end of the transfer chute 4 so that the said movable end is constantly slightly below the active surface of the linear motor. This hinged chute 9 also serves as a member connecting with the frame 10 of the transfer chute 4 in such a manner as to receive the reaction of the thrust of the linear motor 7 whilst permitting its vertical displacement according to the invention.

On the other hand, the linear motor 7 is combined with a fluid cushion device constituted in this embodiment by an intermediate shoe or plate 11 which comprises fluid inlets 12, 12' at its ends and internal conduits for the said fluid, issuing through small orifices or nozzles such as 13 formed at the lower side as shown in FIG. 3. This plate adheres by the other side to the active surface of the linear motor and is thus disposed between the latter and the topmost metal sheet 14 of the pile of metal sheets 15.

This plate 11 forming a fluid cushion must be non-magnetic and preferably of plastics material so as to avoid noise and damage in the case of contact with the metal sheet. It is supplied for example by a conduit 16 connected to a source of compressed air at a pressure of for example 1 bar so as to form the fluid cushion associated with the linear motor.

When the latter is energized electrically with a suitable voltage, the fluid cushion is supplied at the desired pressure and the unit is brought near to the metal sheet 14 by means of the winch 3, then only the topmost metal sheet 14 is raised from the pile 15, maintained at some tenths of millimeter from the lower surface of the plate 11 due to the fluid cushion, and projected on to the articulated chute 9, then on to the transfer chute 4.

Other combined propulsion devices identical to the propulsion unit 7 - 11 or similar, may then continue the transfer of the metal sheet.

FIGS. 4 and 5 show another embodiment applied to the transfer of metal sheets separated or in continuous strips on a chute designed to support the metal sheets on a cushion of air. To this end, the chute comprises a lower chamber 21 under low pressure for example 10 millibars, by means of a fan 22 and a transfer platform 23 provided with orifices such as 23'. At right angles to the propulsion system, the chamber 21 forms a cavity 24 below the platform 23 with abutments in front and behind 25, 25' between which the movable chassis 26 of the propulsion unit may be displaced vertically. These abutments, together with springs 27, 27' balancing the weight of the propulsion unit, constitute the connecting member according to the invention.

In this embodiment, the said unit is constituted by a linear motor 28 and three independent air cushion shoes 29, 29', 29" fixed at three points to the chassis 26. Each of these three shoes is articulated on a ball joint such as 30 and penetrated by a nozzle 31 connected to a common source of compressed air 32, for example at 500 millibars, by the coupling connection 33 and flexible tubes such as 34 permitting the vertical movement of the unit. The linear motor 28 is fixed to the chassis 26 by bolts with adjusting washers 35 permitting the adjustment of the active surface of the said motor at a precise distance from the level which the three shoes such as 29 determine, for example 1.5 millimeters, which constitutes substantially the magnetic air gap of the motor in operation. In fact, the clearance between the metal sheet 37 and the discs is reduced to some hundredths of a millimeter.

This arrangement can be used when the metal sheet 37, supposedly ferromagnetic, is thick enough not to curve noticeably under the attraction of the linear motor between the three air cushions.

In these circumstances, bringing the metal sheets into proximity with the propulsion unit whatever the vertical height of the metal sheet above the platform 23 may be according to the intensity of the cushion created by the orifices such as 23', or whatever the possible deformations may be, determines, by magnetic attraction, the raising of the propulsion unit within its maintaining members 25, 25', the support without contact of the shoes such as 29 against the lower surface of the metal sheet permitting the propulsion of the latter under the action of the magnetic field. The magnetic attraction being compensated by the reaction of the fluid cushions on the one hand, and the weight of the unit being balanced by the springs 27, 27' on the other hand, are then without effect on the metal sheet 37 the position of which is not disturbed.

It will be noted that the use of three spaced shoes permits a good stabilization of the propulsive unit despite the possible inclinations or deformations of the metal sheet. In fact, it is known that to support a load stably, at least three fluid cushions having independent characteristics are required if the stability of the charge is not ensured in other ways. Means for ensuring the said independence are described for example in U.S. Pat. No. 3,263,764 of the Bertin & Cie (Assignee). The ball joint mounting for each of them also enables them to be applied quite flat against each facing portion of the metal sheet.

So as to avoid any premature operation of the linear motor, an improvement according to the invention consists in a safety relay which delays the supply of electric current until the establishment of a sufficient pressure for feeding the fluid cushions. An example of this is shown in FIG. 4 where 40 defines an electric supply switch for the linear motor 28, which is controlled by pressure transmitted through the pneumatic duct 41 which is connected to the coupling 33.

In this manner, shocks or rubbing on the metal sheet by shoes not supplied with fluid are precluded.

I claim:

1. An apparatus for propelling a metal sheet in a predetermined progress direction with respect to a stationary support system, of the kind operating by means of a motor-and-cushion assembly comprising
   (i) a linear induction motor adapted to subject said metal sheet to an electric field which has the twofold effect of developing between said motor and said sheet both an attraction force component normal to said progress direction and a propulsion force component parallel to said progress direction,
   (ii) a pressure fluid cushion generating means extending adjacent said sheet with but a slight clearance with respect thereto, for building up a pressure fluid cushion in said clearance and against said sheet in antagonism with said attraction force component, to keep said sheet and said motor-and-cushion assembly apart from each other and in noncontact relationship, and
   (iii) connecting means between said stationary support system and said motor-and-cushion assembly allowing relative displacement of said assembly normal to said progress direction while restraining said assembly against relative displacement parallel to said progress direction,
   wherein the improvement comprises
   (iv) an electric energizing circuit for said linear induction motor, and cushion fluid supply pressure responsive switching means in said energizing circuit for making said circuit upon pressure fluid being supplied to said cushion generating means.

2. Apparatus as claimed in claim 1, wherein said metal sheet is caused to progress along a generally horizontal path, and wherein said motor-and-cushion assembly is positioned underneath said path and is susceptible of generally vertical relative displacement while being restrained against generally horizontal relative displacement.

3. Apparatus as claimed in claim 2, further comprising a fixed fluidic track integral with said stationary support system and extending generally horizontally beneath said path adjacent thereto, means for feeding said fixed fluidic track with cushion fluid at a relatively low pressure, and means for feeding said cushion generating means of said vertically movable assembly with cushion fluid at a relatively high pressure.

4. Apparatus as claimed in claim 3, wherein said cushion generating means fed with high-pressure fluid comprises three separate and distinct shoes positioned around said linear induction motor and individually supplied with said high-pressure fluid.

5. Apparatus as claimed in claim 2, further comprising means for counterbalancing the weight of said motor-and-cushion assembly.

6. Apparatus as claimed in claim 1, wherein said cushion generating means is fast with said linear induction motor to be bodily movable therewith normal to said sheet progress direction.

* * * * *